(12) United States Patent
Joichi et al.

(10) Patent No.: US 6,342,909 B1
(45) Date of Patent: Jan. 29, 2002

(54) METHOD AND APPARATUS FOR IMAGE FORMATION WHILE CONSIDERING A POSITION OF A TRANSFER SHEET IN A PRIMARY SCANNING DIRECTION

(75) Inventors: Norio Joichi; Youbao Peng; Hiroyuki Watanabe; Satoshi Sakata; Makoto Ui; Fumio Haibara, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/527,842

(22) Filed: Mar. 17, 2000

(30) Foreign Application Priority Data

Mar. 23, 1999 (JP) ............................................. 11-077728

(51) Int. Cl.[7] .............................................. G03G 15/00
(52) U.S. Cl. ........................ 347/129; 347/248; 399/394
(58) Field of Search ................................ 399/394, 395; 347/129, 139, 153, 234, 248, 262; 358/401

(56) References Cited

U.S. PATENT DOCUMENTS 4,712,118 A * 12/1987 Seto et al. .................. 347/177
5,140,340 A * 8/1992 Stephenson .................. 347/248
6,052,552 A * 4/2000 Ohsumi et al. ............. 399/394
6,137,989 A * 10/2000 Quesnel ...................... 399/394

* cited by examiner

Primary Examiner—Joan Pendegrass
(74) Attorney, Agent, or Firm—Frishauf, Holtz, Goodman, Langer & Chick, P.C.

(57) ABSTRACT

An image forming apparatus includes: a writing device for writing an image on the basis of image data thereof; a controller for controlling a writing position in a primary scanning direction by the writing device; a conveying device for conveying a recording material; and a position detecting sensor for detecting an edge of the recording material, which is conveyed by the conveying device in the primary scanning direction as an absolute position. The controller determines the writing position in the primary scanning direction by the writing device on the basis of a position of the edge of the recording material in the primary scanning direction detected by the position detecting sensor, and controls the writing position of the writing device in the primary scanning direction.

19 Claims, 9 Drawing Sheets

FIG. 7 (a) REGISTRATION DRIVE MOTOR ON/OFF SIGNAL

FIG. 7 (b) REGISTRATION CLUTCH ON/OFF SIGNAL

FIG. 7 (c) RECORDING SHEET LEADING EDGE DETECTING SENSOR SIGNAL

FIG. 7 (d) SUB-SCANNING SIGNAL

FIG. 7 (e) SENSOR START PULSE

FIG. 7 (f) RECORDING SHEET EDGE POSITION TRANSMITTING DATA

FIG. 7 (g) SENSOR START PULSE

FIG. 7 (h) SENSOR DRIVE CLOCK

FIG. 7 (i) SENSOR OUTPUT SIGNAL

FIG. 7 (j) SAMPLE HOLDING CIRCUIT OUTPUT SIGNAL

FIG. 7 (k) COMPARATOR OUTPUT SIGNAL

FIG. 7 (l) RECORDING SHEET EDGE POSITION DATA

PRIOR ART

METHOD AND APPARATUS FOR IMAGE FORMATION WHILE CONSIDERING A POSITION OF A TRANSFER SHEET IN A PRIMARY SCANNING DIRECTION

BACKGROUND OF THE INVENTION

The present invention relates to a writing control method and an image forming apparatus, and particularly to the control by which an optimum image formation can be realized corresponding to a position of a transfer sheet in the primary scanning direction.

Figure 9:
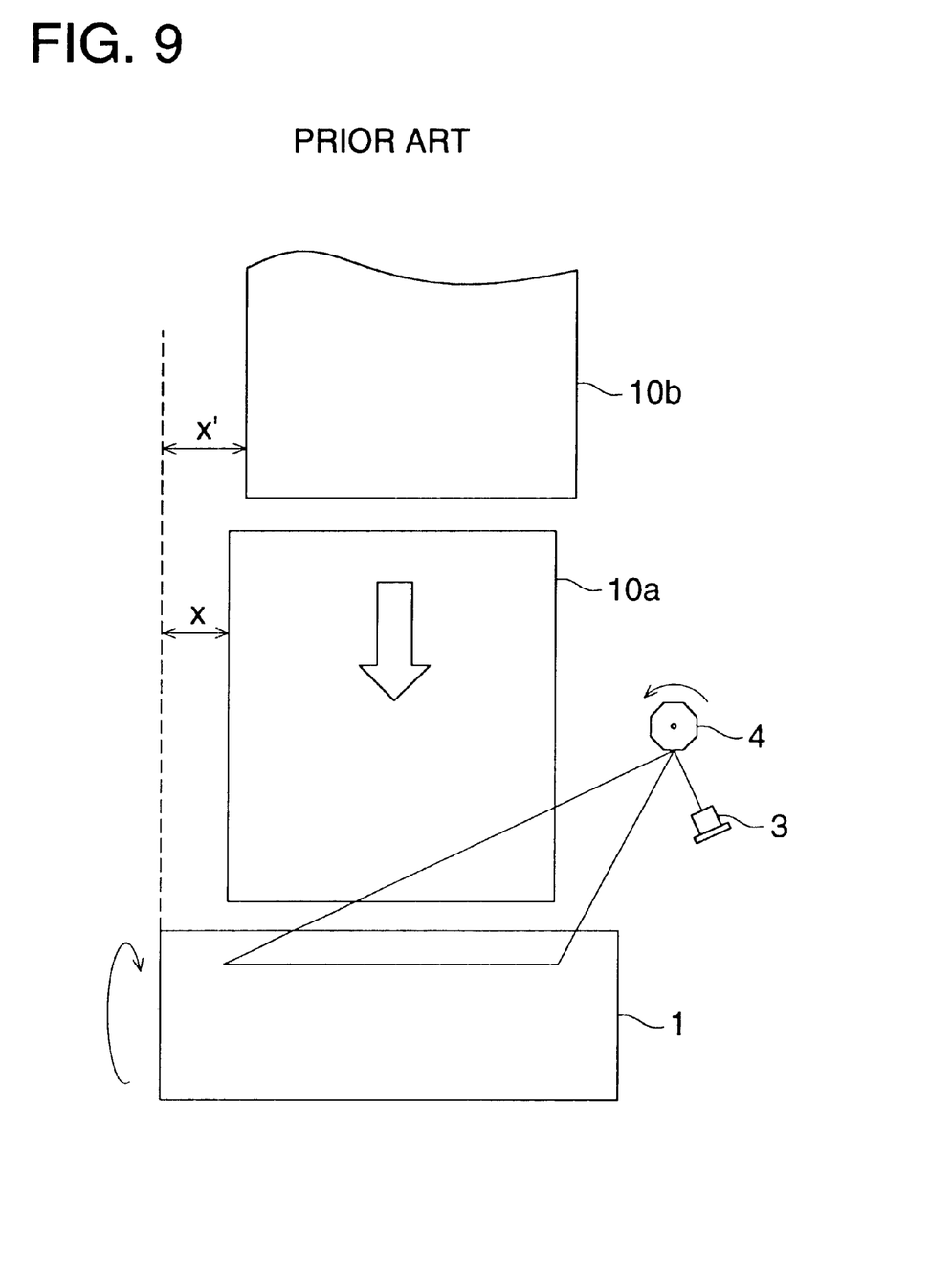
FIG. 9 is an illustration showing a condition at the time of operation of the conventional image forming apparatus.

FIG. 9 is a plan view showing an outline structure of an image forming apparatus such as a laser printer. In FIG. 9, numeral 1 is a photoreceptor drum, numeral 3 is a semiconductor laser to generate the laser light corresponding to a writing signal, numeral 4 is a polygon mirror to conduct the deflection-scanning by using the laser light, and numerals 10a and 10b are transfer sheets.

Herein, the photoreceptor drum 1 is rotated at a constant speed, and an electrostatic latent image is formed by the laser light on the surface of the photoreceptor drum 1. This electrostatic latent image is developed as a toner image by a developing unit, not shown, and the toner image is transferred onto the transfer sheet by a transfer unit, also not shown.

In this kind of image forming apparatus, when the transfer sheet is conveyed to quite the same position, the same image can be formed on the transfer sheet.

However, due to each kind of the slippage or sheet skew generated on a conveyance path from a sheet feed cassette to the photoreceptor drum, a slight slippage of position is caused.

When such the slippage or sheet skew occurs, in the conveyance direction, positioning can be conducted by a registration roller just before the transferring.

However, for the slippage or sheet skew in the direction perpendicular to the conveyance direction (primary scanning direction), it is necessary to detect the slippage of position and to change the scanning position of the laser light. In an example shown in FIG. 9, the situation of change from the state that the distance from a predetermined position is X in the transfer sheet 10a, to the state of X' in the transfer sheet 10b, is typically shown.

For such the slippage of the transfer sheet in the direction perpendicular to the conveyance direction, conventionally, the correction is conducted by oscillating a conveyance roller in the axial direction, however, the sufficient accuracy can not be obtained.

Further, in Japanese Patent Publication No. 2550558, an image forming apparatus in which the relative slippage of the transfer sheet to its ideal reference position is detected, and the position of the image formation is corrected corresponding to the slippage, is shown. Incidentally, in the image forming apparatus shown in the patent publication, the slippage of the position of the transfer sheet is detected by a plurality of light receiving elements, the plurality of detection results from the light receiving elements are connected to a ROM, and are converted into the slippage amount in the ROM.

In such the image forming apparatus, there is a problem that a large number of wiring corresponding to the resolving power is necessary between sensors and the ROM. In the actual apparatus, the sensor section is arranged on the conveyance path, however, the ROM is located on a circuit board at the remote position, therefore, there is a problem of generation of radio noise or malfunction due to external noise.

Further, because the position of the transfer sheet is detected as the relative slippage from the reference value, when the size of the transfer sheet is changed, there is also a disadvantage that this system can not cope with it, or the treatment becomes very complicate.

SUMMARY OF THE INVENTION

Accordingly, an object of the present invention is to realize a writing control method and an image forming apparatus by which, when the position of the transfer sheet is detected, the radio noise is not generated, and further, the influence of the external noise is not affected, and the image forming position is determined corresponding to the position of passage of the transfer sheet and the stable image formation can be realized.

The above object can be attained by any one of the following structures (1) to (17).

(1) In a writing control method of an image forming apparatus using a digital method, having a photoreceptor and a writing means for writing an image onto the photoreceptor, the writing control method is characterized in that a position of passage of a transfer sheet in the primary scanning direction is detected by a position detection sensor as an absolute position, and according to the detection result, the writing position is determined.

In this structure, because the position of passage of the transfer sheet in the primary scanning direction is detected by the position detection sensor as the absolute position, and according to the detection result, the writing position is determined, thereby, without depending on the passage position of the transfer sheet or the size of the transfer sheet, the stable image formation can be carried out by the determination of the accurate writing position.

(2) A digital system image forming apparatus having: the photoreceptor; a memory means for storing the supplied image data; and the writing means for writing the stored image data onto the photoreceptor as an image, the image forming apparatus is characterized in that it is provided with the position detection sensor to detect the passage position of the transfer sheet in the primary scanning direction as the absolute position, and a writing control means for determining the writing position by the writing means according to the passage position information by the position detection sensor.

In this structure, because the position of passage of the transfer sheet in the primary scanning direction is detected by the position detection sensor as the absolute position, and according to the detection result, the writing position is determined, thereby, without depending on the passage position of the transfer sheet or the size of the transfer sheet, the stable image formation can be carried out by the determination of the accurate writing position.

(3) The image forming apparatus according to the structure (2), wherein the position detection sensor is a contact type line sensor using an LED light source.

In this structure, because the position of passage of the transfer sheet in the primary scanning direction is detected as the absolute position by the position detection sensor structured by the contact type line sensor, and according to the detection result, the writing position is determined, thereby, without depending on the passage position of the transfer sheet or the size of the transfer sheet, the stable image formation can be carried out by the determination of the accurate writing position.

(4) The image forming apparatus according to the structure (3), wherein the contact type line sensor is a clock operation type contact type line sensor.

In this structure, because the position of passage of the transfer sheet in the primary scanning direction is detected as the absolute position by the position detection sensor structured by the clock operation type contact type line sensor, and according to the detection result, the writing position is determined, thereby, by counting clocks, without depending on the passage position of the transfer sheet or the size of the transfer sheet, the stable image formation can be carried out by the determination of the accurate writing position.

(5) The image forming apparatus according to the structure (4), wherein the detection resolving power of the contact type line sensor is not smaller than 0.25 mm. In other words, the detection resolving power of the contact type line sensor has a detection error of not more than 0.25 mm.

In this structure, because the detection resolving power of the contact type line sensor is not smaller than 0.25 mm, the accuracy of about 100 dpi is obtained, thereby, the stable image formation can be carried out by the determination of the accurate writing position, without depending on the passage position of the transfer sheet or the size of the transfer sheet.

(6) The image forming apparatus according to the structure (5), wherein the detection resolving power of the contact type line sensor is integer times or a reciprocal of integer times the writing resolving power.

In this structure, because the detection resolving power of the contact type line sensor is integer times or a reciprocal of integer times the writing resolving power, the accuracy proportional to the writing resolving power is obtained, therefore, a calculation necessary for determination of the writing position becomes easy, and the treatment can be simplified.

The stable image formation can be carried out by the determination of the accurate writing position, without depending on the passage position of the transfer sheet or the size of the transfer sheet.

(7) The image forming apparatus according to the structure (2), wherein a registration roller to feed the transfer sheet onto the surface of the photoreceptor is provided, and the position detection sensor is arranged on the downstream side of the registration roller.

In this structure, because the position detection sensor is arranged on the downstream side of the registration roller, the sheet skew is corrected, and the accurate writing position can be determined corresponding to the final passage position of the transfer sheet, thereby, the accurate and stable image formation can be carried out.

(8) The image forming apparatus according to the structure (7), wherein lighting of an LED light source of the contact type line sensor is in timed relationship with the driving start of the registration roller driving source.

In this structure, because lighting of the LED light source of the contact type line sensor is in timed relationship with the drive of the registration roller driving source, the passage position of the transfer sheet can be detected without uselessness, and the accurate writing position can be determined, thereby, the accurate and stable image formation can be carried out.

(9) The image forming apparatus according to the structure (3), wherein the contact type line sensor is driven by using a clock which is made to be outputted during the driving of the registration roller.

In this structure, because the lighting of the LED light source of the contact type line sensor is driven by using a clock which is made to be outputted during the driving of the registration roller, the unnecessary clock is not generated, and the stable image formation can be carried out.

(10) The image forming apparatus according to the structure (3), wherein the contact type line sensor has dimensions of a range at least to cover one end of the maximum sized transfer sheet and one end of the minimum sized transfer sheet.

In this structure, because the contact type line sensor having a range at least to cover one end of the maximum sized transfer sheet and one end of the minimum sized transfer sheet, is used, the stable image formation can be carried out by the determination of the accurate writing position, without depending on the passage position of the transfer sheet or the size of the transfer sheet.

(11) The image forming apparatus according to the structure (2), wherein a transfer sheet leading edge sensor to detect the leading edge of the transfer sheet is provided at a position at which the transfer sheet leading edge sensor is almost the same phase as the position detection sensor to the conveyance direction of the transfer sheet, and the passage position of the transfer sheet in the primary scanning direction is detected as the absolute position by the position detection sensor, after a predetermined time after the leading edge of the transfer sheet is detected by the transfer sheet leading edge sensor.

In this structure, because the passage position of the transfer sheet is detected at the predetermined timing after the leading edge of the transfer sheet is detected, the state that the transfer sheet actually passes can be accurately detected, thereby, the stable image formation can be carried out by the determination of the accurate writing position, without depending on the passage position of the transfer sheet or the size of the transfer sheet.

(12) The image forming apparatus according to the structure (3), wherein the position of the transfer sheet is detected by the position detection means comprising: a counter to count the driving clocks of the contact type line sensor; a sample hold means for holding the sensor output outputted in timed relationship with the driving clocks of the contact type line sensor; and a comparator to compare the holding result by the sample hold means to a predetermined value.

In this structure, the sensor output is held by the sample hold circuit, and compared with a predetermined value by the comparator, thereby, a stable sheet end position signal can be obtained, and the stable image formation can be carried out by determination of the accurate writing position.

(13) The image forming apparatus according to the structure (12), wherein the count stop of the counter is conducted by a point of output change of the comparator, and the stopped counter value is made a position of the transfer sheet.

In this structure, because counting of the driving clocks is stopped by the point of output change of the comparator, the state that the transfer sheet actually passes can be accurately detected, thereby, the stable image formation can be carried out by the determination of the accurate writing position.

(14) The image forming apparatus according to the structure (12), wherein the counter and the comparator are arranged in the vicinity of the contact type line sensor, and the output of the counter which is stopped by the point of the output change of the comparator is transferred to the writing control means in the serial communication.

In this structure, because the processing circuit to detect the passage position of the transfer sheet is arranged in the vicinity of the contact type line sensor, the wiring which has a possibility of generating noises, is greatly shortened. Because the output of the counter which is the detection result, is transferred in the serial communication, data can be transferred even when the number of wiring is small, and in the portion in which the wiring becomes long, a possibility of generating noises can be reduced.

(15) The image forming apparatus according to the structure (12), wherein the data of the passage position of the transfer sheet obtained by the position detection means is compared with a previously given predetermined value, and according to the comparison result, the writing position is determined.

In this structure, because the data of the passage position of the transfer sheet is compared with a predetermined value, thereby, the stable image formation can be carried out by the determination of the accurate writing position, without depending on the passage position of the transfer sheet or the size of the transfer sheet.

(16) An image writing control method of the image forming apparatus which is characterized in that: the edge position in the primary scanning direction of the recording material is detected by the position detection sensor as the absolute position; the writing position of in the primary scanning direction by the writing device is determined by defining the position of the edge position in the primary scanning direction of the recording material detected by the position detection sensor; and the writing device is controlled corresponding to the determined writing position.

Incidentally, "the writing position of in the primary scanning direction by the writing device is determined by defining the position of the edge position in the primary scanning direction of the recording material as the absolute position" implies that it is not the following: the position of the edge position of the recording material detected by the position detection sensor is compared with the reference position which is different corresponding to sizes of each recording material, and the slippage between them is found, and the writing position is determined according to the result.

(17) An image forming apparatus, which comprising: the writing device to write an image according to the image data; the control device to control the writing position in the primary scanning direction by the writing device; the conveyance device to convey the recording material; and the position detection sensor to detect the edge position of the recording material, which is conveying by the conveyance device in the primary scanning direction as the absolute position, the image forming apparatus is characterized in that: the control device determines the writing position of in the primary scanning direction by the writing device by defining the position of the edge position in the primary scanning direction of the recording material detected by the position detection sensor, and controls the writing position in the primary scanning direction of the writing device.

DETAILED DESCRIPTION OF THE PREFERRED EMBODIMENT

Referring to the drawings, an embodiment of the present invention will be detailed below.

Incidentally, the present embodiment is an embodiment of an electrostatic recording system image forming apparatus in which an electrostatic latent image formed by exposing on the photoreceptor, is developed by toner, and after the toner image is thermally fixed, an image is obtained, however, the present invention is not limited to such the apparatus, but also includes an inkjet system or a sublimation type transfer system image forming apparatus.

Figure 1:
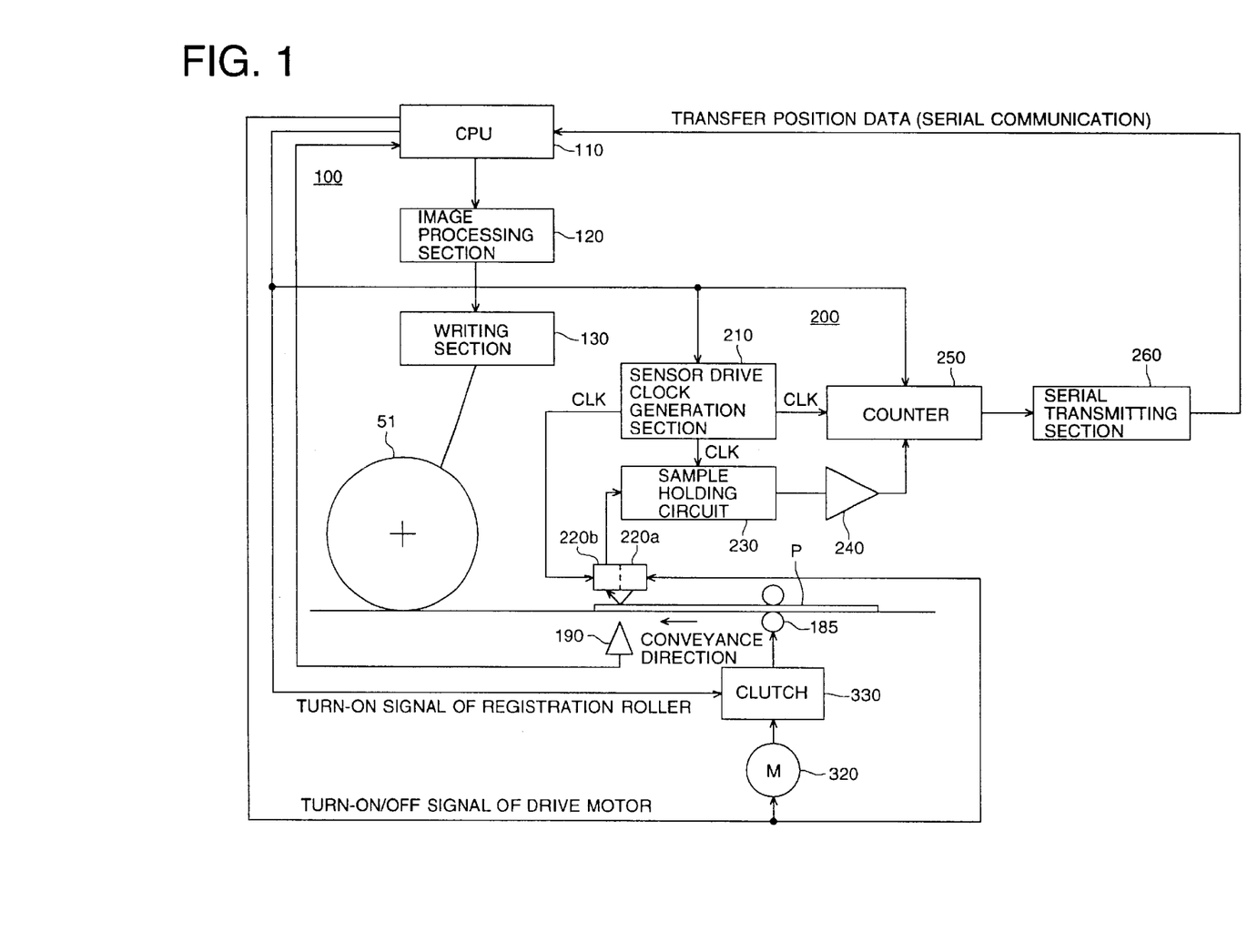
FIG. 1 is a function block diagram showing the electrical structure of an image forming apparatus of an embodiment of the present invention.
Figure 2:
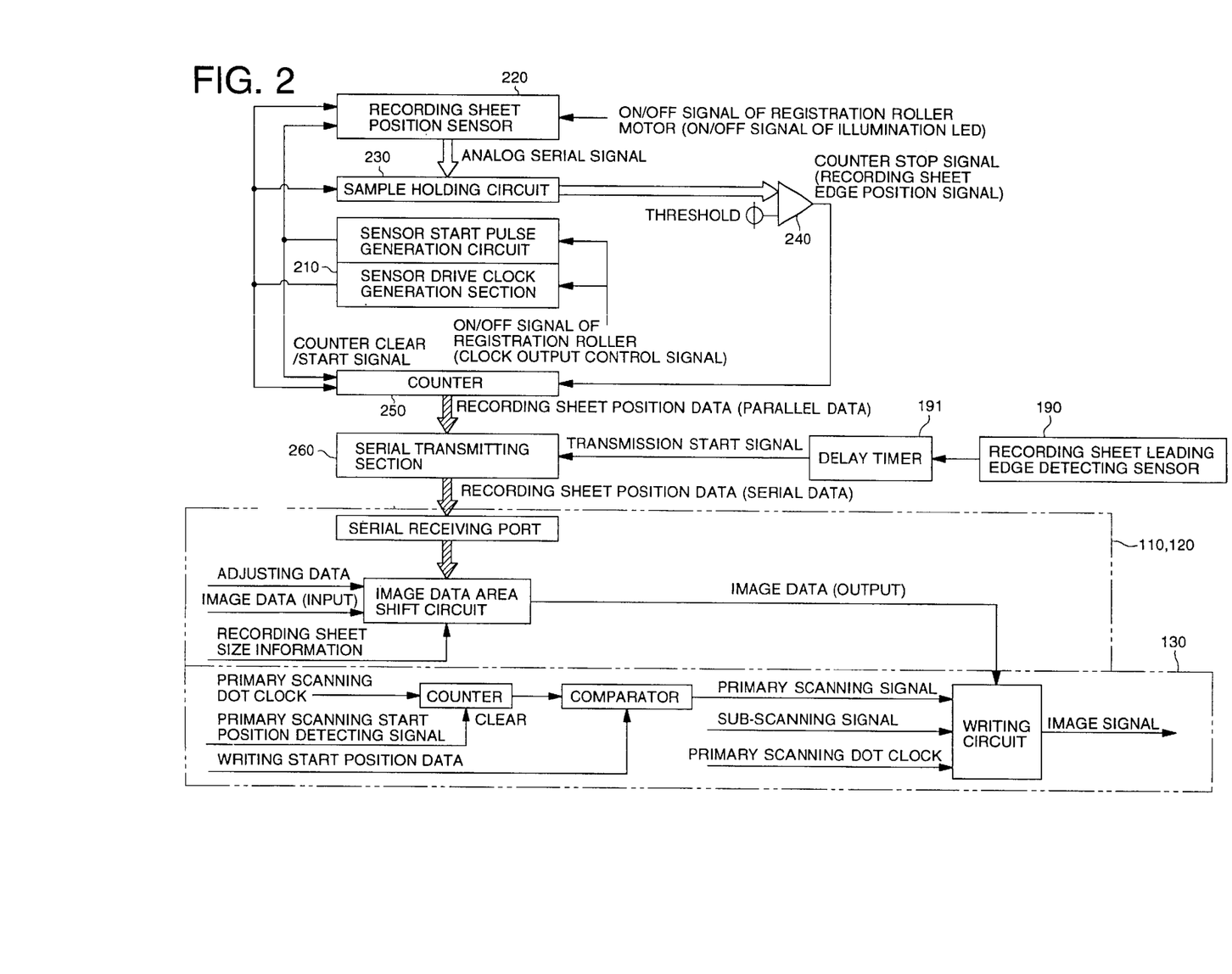
FIG. 2 is a function block diagram showing the detailed electrical structure of a main portion of the image forming apparatus of an embodiment of the present invention.
Figure 3:
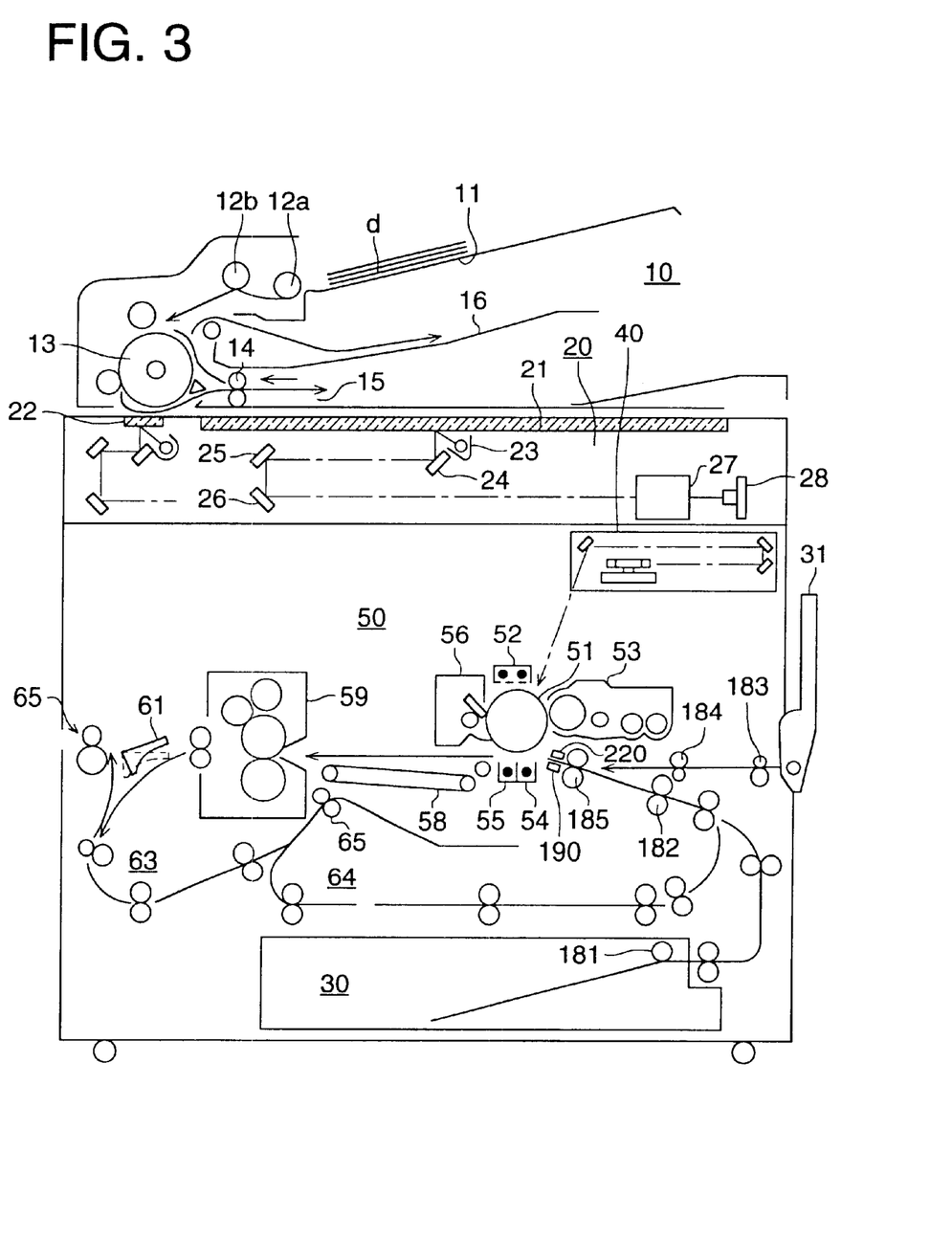
FIG. 3 is a structural view showing the mechanical structure of the image forming apparatus of an embodiment of the present invention.

FIG. 1 is a block diagram showing an example of an electrical structure of an image forming apparatus of the embodiment of the present invention, FIG. 2 is a block diagram showing an example of a detailed electrical structure of a main portion of an image forming apparatus of the embodiment of the present invention, and FIG. 3 is a sectional side view showing a mechanical structure of an image forming apparatus of the embodiment of the present invention.

Initially, referring to FIG. 3, the overall image forming apparatus will be described. Incidentally, in this embodiment, as the image forming apparatus, a copier will be described.

In FIG. 3, on a document placement portion 11 of an ADF 10 by which a two-sided document can be fed, a plurality of documents "d" whose each first page is facing upward, are placed. The first sheet of the document fed through a roller 12a and roller 12b is conveyed through a roller 13.

Next, the document surface of the document "d" is radiated by a light source 23, and the reflected light forms an image on a light receiving surface of a CCD 28, which is an photoelectric conversion means, through an image forming optical system 27 through mirrors 24, 25 and 26. Herein, an image reading section 20 is structured by an optical system having the light source 23, mirrors 24, 25, 26, image forming optical system 27 and CCD 28, and an optical system driving means, not shown.

In FIG. 3, when the document "d" is placed on a platen glass 21 with a state in which the reading surface of the document "d" is facing downward, the optical system scans the reading surface along the platen glass 21 and reads it.

Further, when the document "d" is automatically fed and rotates around the roller 13, the reading is conducted in the state that the light source 23 and the mirror 24 are fixed under the second platen glass 22.

Then, the image data of the read document "d" is sent from the CCD 28 to an image processing section 120, not shown.

Incidentally, in the case where the document "d" is automatically fed by the ADF 10, when the first page of the document "d" is read, next, a winding operation using again the roller 13 is conducted through a reversal roller 14, and a reverse image of the document is read by the image reading section 20, and sent to the image processing section 120.

According to these operations, the document "d" whose obverse and reverse images are read, is reversed again by the reversal roller 14, and stacked on a delivery sheet tray 16 in the state that the obverse side of the document "d" is facing downward.

According to this, the image data read by the image reading section 20 is subjected to a predetermined image processing in the image processing section 120, after that, compressed and stored in an image memory.

On the one hand, a transfer sheet "p" is fed from a sheet feed cassette 30 on which transfer sheet are stacked, by a conveyance roller 181, and fed to an image forming section 50. Further, from a hand feeding tray 31, the transfer sheet "p" is fed by a conveyance roller 183, and fed to the image forming section 50.

Then, after the transfer sheet "p" fed to the image forming section 50 is synchronized by a registration roller 185 located near the inlet of the image forming section 50, the transfer sheet "p" approaches the photoreceptor drum 51 which is a image carrier. That is, the first conveyance path from the sheet feed cassette 30 to the registration roller 185, and the second conveyance path from the hand feeding tray 3 to the registration roller 185 are provided.

The leading edge of the transfer sheet "p" synchronized by the registration roller 185 is detected by a leading edge detection sensor 190, and the passage position in the primary direction of the transfer sheet "p" is detected by a position detection sensor 220 structured by the contact type line sensor. Incidentally, the detection of the passage position will be further detailed later.

The image data is inputted from the image processing section to an image writing section 40, and the laser light corresponding to the image data is irradiated from the laser diode in the image writing section 40 onto the photoreceptor drum 51, and the electrostatic latent image is formed. By developing the electrostatic latent image by a developing section 53, the toner image is formed on the photoreceptor drum 51.

The toner image is transferred onto the transfer sheet "p" by a transfer section 54 located below the photoreceptor drum 51. The transfer sheet "p" brought into contact with the photoreceptor drum 51 is separated by a separation section 55. The transfer sheet "p" separated from the photoreceptor drum 51 enters into a fixing section 59 through a conveyance mechanism 58, and the toner image is fixed by heat and pressure. According to this, an image is formed on the transfer sheet "p".

Incidentally, when the reversal sheet re-feeding is necessary at the time of two-sided image formation, the transfer sheet "p" on one side of which the toner image is fixed, is conveyed to the lower side through a guide 61, and enters into a reversal section 63. Next, the transfer sheet "p" which enters into the reversal section 63, is conveyed again by the reversal roller, and sent again to the image forming section 50 through the reversal conveyance path 64. In the image forming section 50 in which the image formation on the one side of the document "d" is completed, the toner adhered onto the photoreceptor drum 51 is removed by a cleaning section 56, and the photoreceptor drum 51 stands by the next image formation.

In this state, the other side of the transfer sheet "p" (the surface on which the image is not yet formed) is conveyed to the image forming section and the image is formed. The transfer sheet separated from the photoreceptor drum 51 by the separation section 55 enters again into the fixing section 59 through the conveyance mechanism 58, and is fixed. According to that, the transfer sheet "p" whose reverse and obverse image formation has been completed, or the transfer sheet "p" on whose one side surface the image formation has been completed, is delivered to the outside of the apparatus.

Herein, referring to FIG. 1 and FIG. 2, an image forming apparatus of the present embodiment by which the writing position is determined corresponding to the position at the passage position of the transfer sheet, and the stable image formation can be realized, will be described.

In FIG. 1 and FIG. 2, numeral 110 is a CPU as the control means for controlling each section of the image forming apparatus, and for controlling the detection of passage position of the transfer sheet "p" and the determination of writing position. Numeral 120 is the image processing section to control so as to change the writing position in the primary scanning direction after receiving the information of the writing position determined by the CPU 110. Numeral 130 is the writing section to write the image onto the photoreceptor drum 51 by the laser beam by receiving the processing result by the image processing section 120.

Incidentally, the processing section 100 comprising the CPU 110, image processing section 120 and writing section 130, is arranged on a main circuit board.

Further, numeral 210 is a sensor driving clock generation section to generate the sensor driving clock to drive the position detection sensor, and is structured such that the drive of the position detection sensor and the measurement of the passage position of the transfer sheet are conducted by the sensor driving clock. Numeral 220 is the position detection sensor structured by the contact type line sensor driven by the sensor driving clock, and is structured by an LED light source 220a serving as a light emitting section, and the line sensor 220b serving as a light receiving section. Incidentally, in the case of the contact type line sensor, the focal distance of the light emitted from the light source is very short.

When, as this LED light source 220a, a red LED is used, the responsibility is better, and preferable. Further, a reading sensor of a facsimile apparatus can be used as the light receiving section 220b. Incidentally, for the LED light source and the light receiving section 22b, it is not necessary that the light emitting element corresponds to the light receiving element in 1 to 1.

Numeral 230 is the sample hold circuit by which the output of the position detection sensor 220 is sampled and held by being in timed relationship with the sensor driving clock. Numeral 240 is a comparator to compare the holding result of the sample hold circuit 230 to a predetermined value (transfer sheet detection level). Numeral 250 is a counter to count the sensor driving clock when the output of the comparator 240 is in a predetermined state. Numeral 260 is a serial transmission section to convert the count result of the counter 250 into the predetermined serial data, and to transfer the data in the serial communication.

Incidentally, these sensor driving clock generation circuit 210, sample hold circuit 230, counter 250, and serial transmission section 260 are arranged in the vicinity of the position detection sensor 220. Incidentally, these are collectively called an end position detection means 200.

Further, numeral 320 is a driving source (driving motor) to drive the registration roller 185, and is controlled by a driving motor ON/OFF signal from the CPU 110. Numeral 330 is a clutch as a transmission mechanism to transmit the rotation force of the motor 320 to the registration roller 185 according to the registration roller ON signal.

Figure 4:
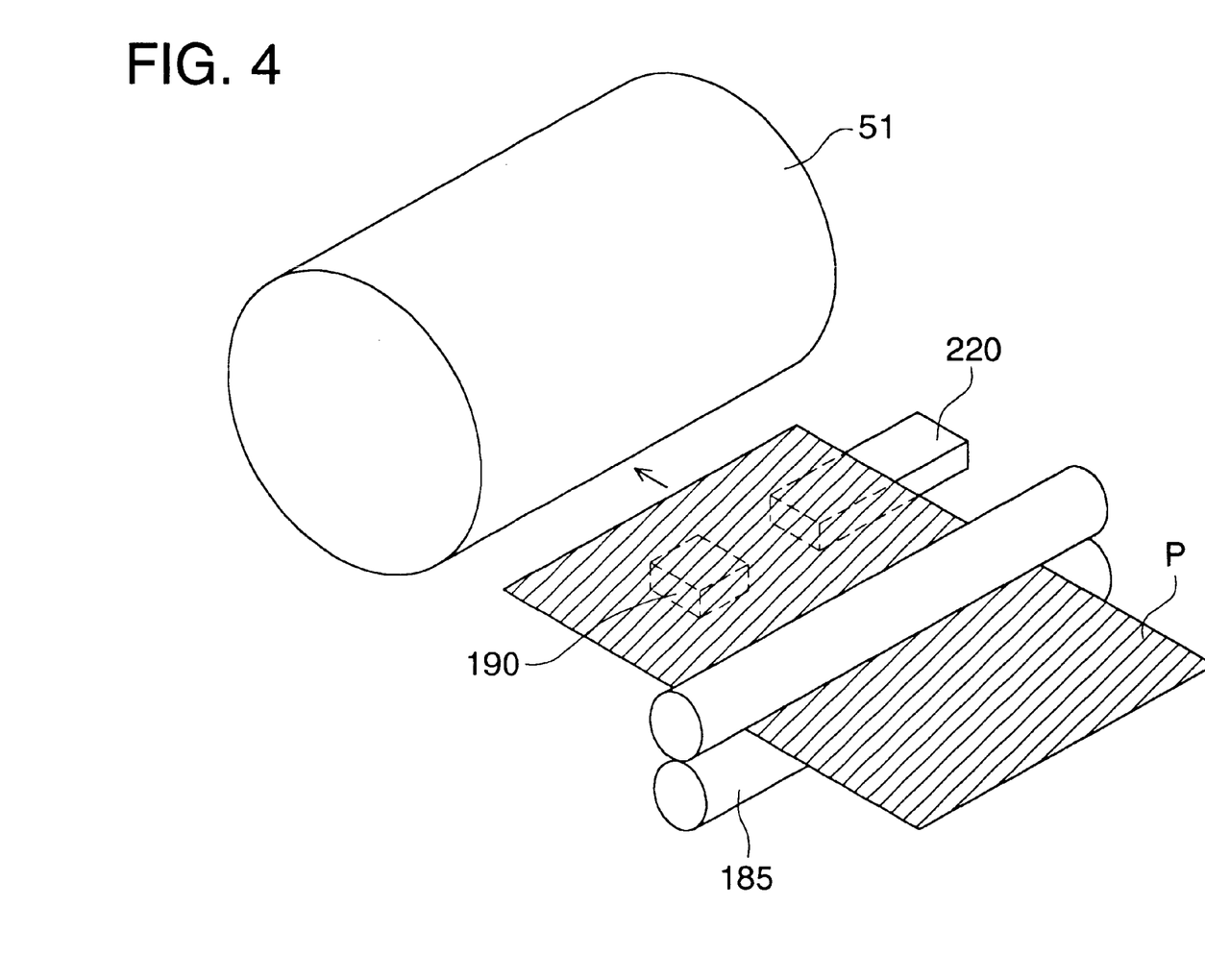
FIG. 4 is a perspective view showing an arrangement of a mechanical main portion of the image forming apparatus of an embodiment of the present invention.
Figure 5:
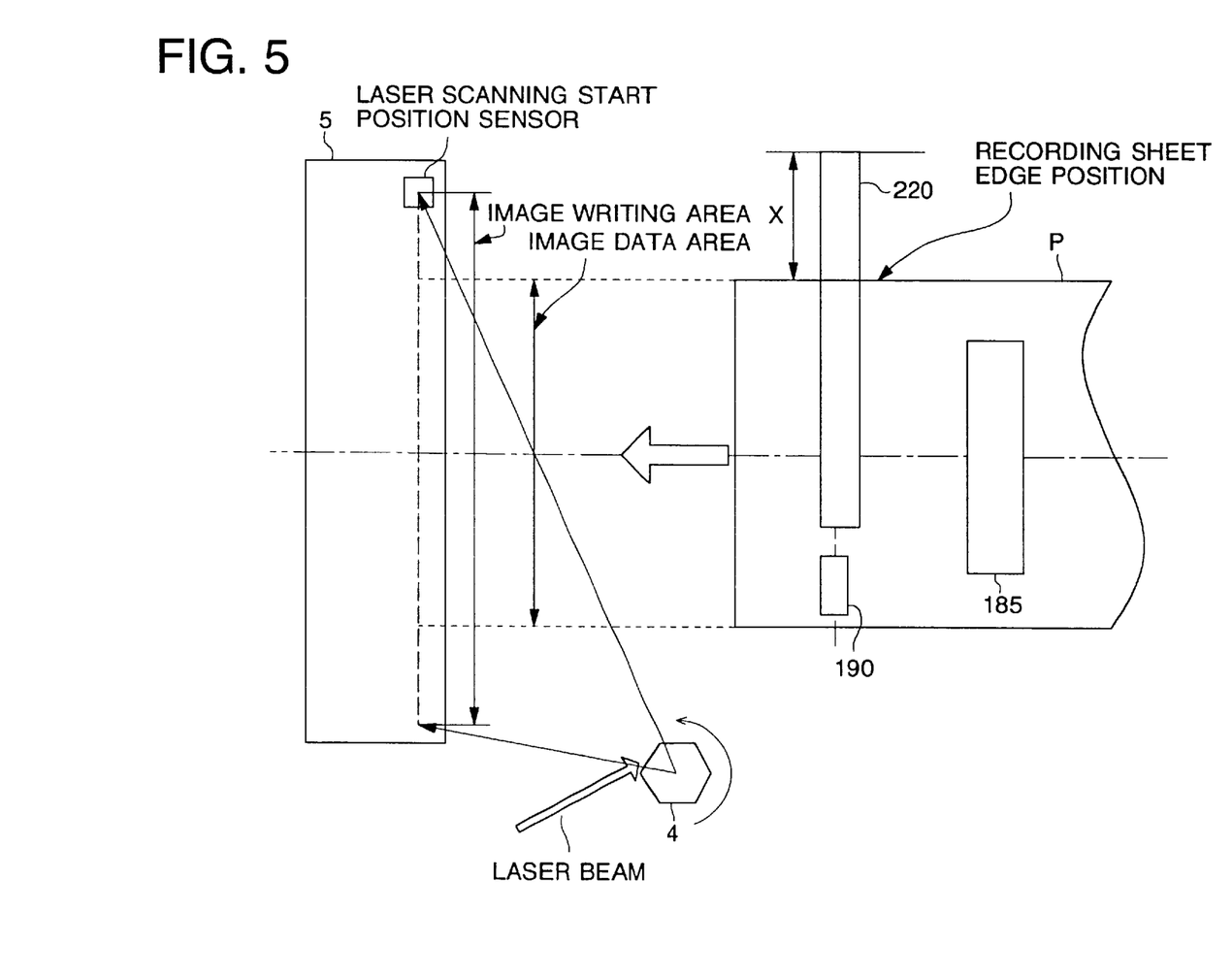
FIG. 5 is a plan view showing an arrangement of a mechanical main portion of the image forming apparatus of an embodiment of the present invention.

Incidentally, when the state of arrangement of the photoreceptor drum 51, registration roller 185, leading edge detection sensor 190, and position detection sensor 220 is shown by a perspective view, the positional relationship is shown in FIG. 4 and FIG. 5.

Figure 6:
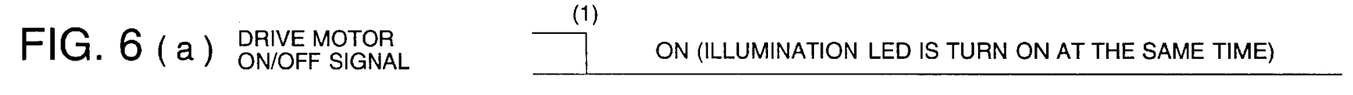
FIGS. 6(a) to 6(e) are time charts showing patterns of signal waves at the time of operation of the image forming apparatus of an embodiment of the present invention.
Figure 7:
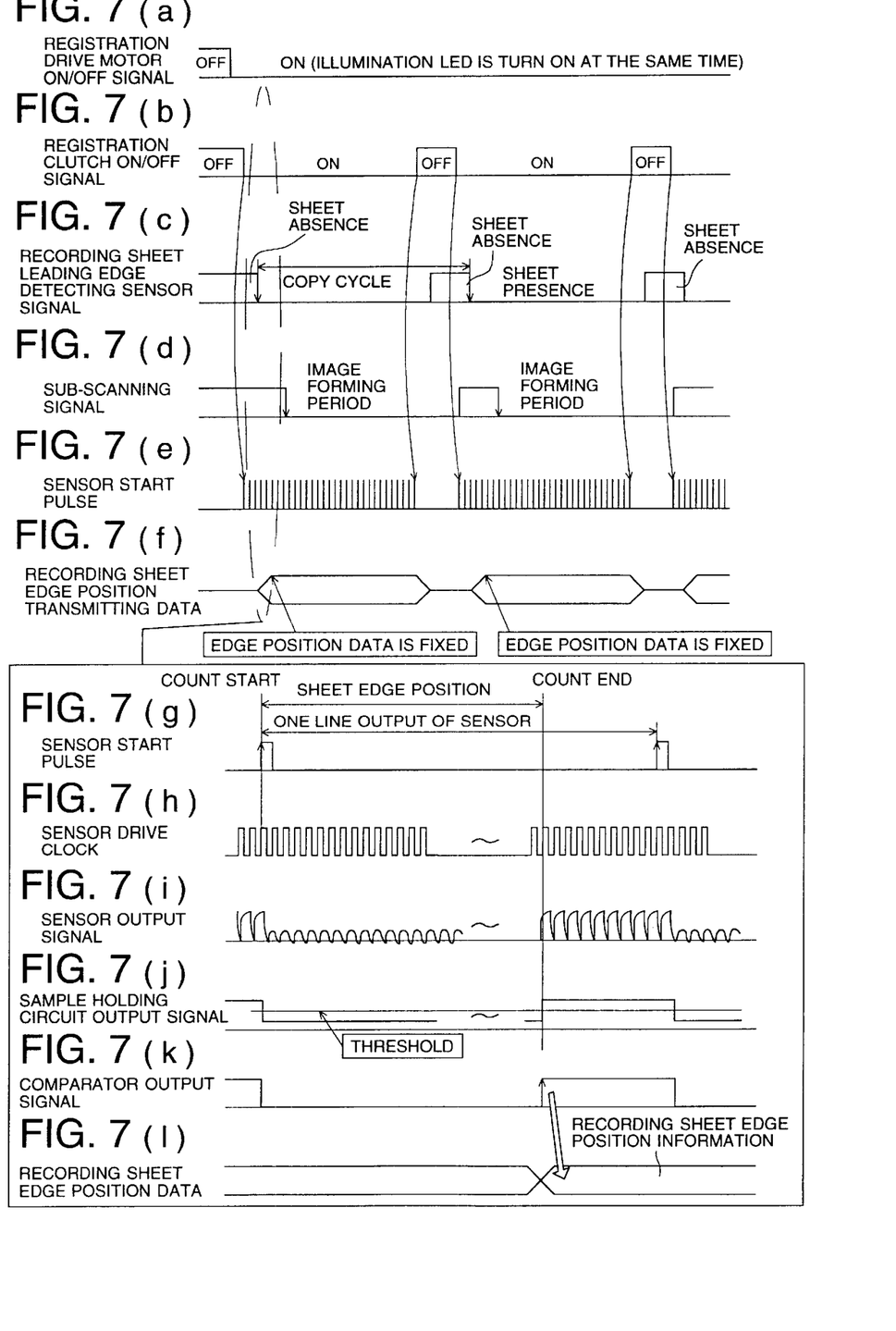
FIGS. 7(a) to 7(l) are time charts showing patterns of signal waves at the time of operation of the image forming apparatus of an embodiment of the present invention.

Incidentally, the leading edge detection sensor 190 and the position detection sensor 220 may be on the same side of the transfer sheet "p", or the leading edge detection sensor 190 and the position detection sensor 220 may be on both sides of the transfer sheet with the transfer sheet between them. FIGS. 6(*a*) to 6(*e*) are time charts showing the state of operations of the present embodiment, and FIGS. 7(*a*) to 7(*l*) are time charts which show further detailed state.

Incidentally, herein, mainly referring to the black diagram in FIG. 1 and time charts in FIGS. 6(*a*) to 6 (*b*), the operations will be described below. Incidentally, these FIGS. 6(*a*) to 6(*e*) are shown on an assumption that an L level is in an active condition.

Initially, when the image formation starts, in order to drive the driving motor 320, a drive motor ON/OFF signal is turned ON by the CPU 110 ((1) in FIG. 6(*a*)).

Then, after that, after the transfer sheet "p" is conveyed and brought into contact with the registration roller 185 and stopped, at a predetermined timing, in order to start rotating of the registration roller 185, a registration roller ON/OFF signal is turned ON ((2) in FIG. 6(*b*)), and the driving force is supplied to the clutch 330. According to this, the transfer sheet "p" is start to be conveyed toward the photoreceptor drum 51.

Incidentally, according to turning ON of this registration roller ON/OFF signal, the LED light source 220*a* is also driven to start light emission. Further, according to turning ON of this registration roller ON/OFF signal, the sensor drive clock generation section 210 generates a sensor drive clock ((3) in FIG. 6(*c*)).

Then, the transfer sheet "p" is conveyed by the drive of the registration roller 185, and detected by the leading edge detecting sensor 190 ((4) in FIG. 6(*d*)).

Further, the passage position of the transfer sheet in the primary scanning direction is detected as the absolute position by the position detection sensor 220 arranged at a position which is almost the same phase as the leading edge detecting sensor 190. In this case, the irradiation light from the LED light source 220*a* is reflected on the transfer sheet "p" up to the position of the edge position in the primary scanning direction of the transfer sheet "p", and detected by the receiving section 220*b*.

Accordingly, a changing point (in FIG. 6(*e*), the changing point from L to H) of the comparator output pulse (FIG. 6(*e*)) obtained by comparison of the output which is sampled and held by the sample hold circuit 230, to a predetermined value by the comparator 240, shows the position of the edge position of the transfer sheet "p" in the primary scanning direction. Accordingly, when a pulse width of the comparator output pulse is counted by using the drive clock of the counter 250, the position of the transfer sheet of the state including the transfer sheet size or the passage position of the transfer sheet, is obtained.

The serial transmission section 260 transmits the count result of the counter 250 showing the position of the edge position of the transfer sheet "p" to the CPU 110 in the serial communication as the transfer position data. Incidentally, actually, the counter 250 counts the comparator output pulse ((5) in FIG. 6(*e*)) after a predetermined time after the leading edge detecting sensor 190 detects the transfer sheet "p".

The CPU 110 received this transfer position data, gives the instruction data to shift the image in the primary scanning direction, to the image processing section 120. According to this instruction data, the image processing section 120 shifts the image data in the primary scanning direction by a necessary amount, and supplies the image data to the writing section 130.

Figure 8:
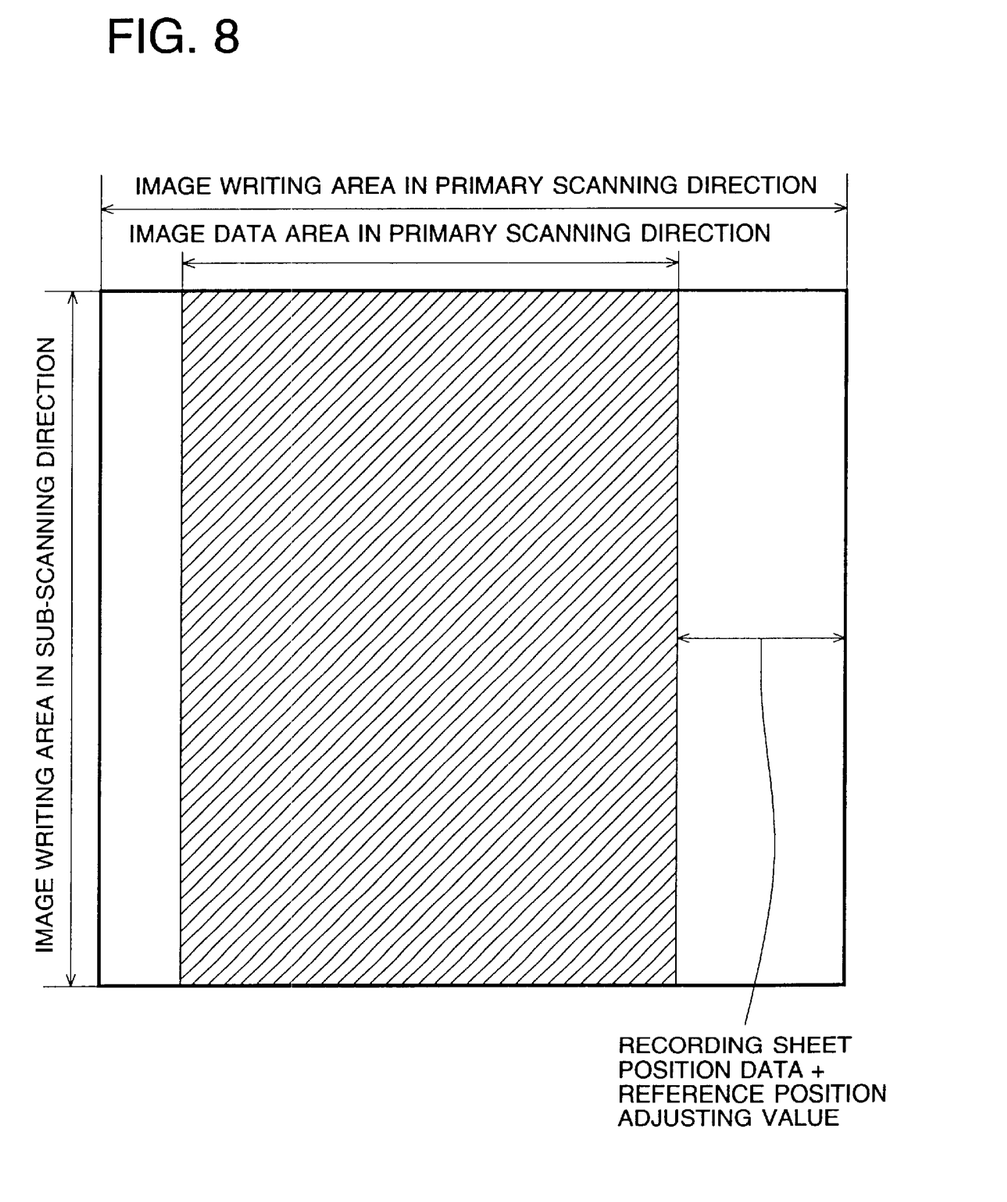
FIG. 8 is an illustration showing a state of a memory at the time of operation of the image forming apparatus of an embodiment of the present invention.

Incidentally, as shown in FIG. 8, when the area to write the image data actually is shifted in the image writing area in the primary scanning direction of the image memory, it can cope with that the image data is shifted in the above-described manner. In this case, when the write address is shifted corresponding to a necessary shift amount, it can cope with the above description, and the change is not necessary for the read, resulting in quick processing.

Herein, a reference position adjustment value is a value to adjust the relative position slippage between the position of the light receiving portion of the most edge position of the position detecting sensor and position of the laser scanning start position sensor (refer to FIG. 5). That is, when each sensor is attached with the high accuracy, and the above relative position slippage is not caused, the reference position adjustment value is set to zero, however, when the relative position slippage is caused at the time of attachment of each sensor, the reference position adjustment value is set corresponding to the slippage value.

Accordingly, according to the writing control method or the image forming apparatus and sensor of the above-described embodiment, the following action and effects can be realized.

In the present embodiment, because the passage position of the transfer sheet "p" in the primary scanning direction is detected as the absolute position by the position detection sensor 220, and according to the detection result, the writing position is determined, the stable image formation can be conducted by the determination of the writing position, without depending on the passage position of the transfer sheet "p" or the size of the transfer sheet "p".

Further, in the present embodiment, because the passage position of the transfer sheet "p" in the primary scanning direction is detected as the absolute position by the position detection sensor 220 structured by the contact type line sensor, and according to the detection result, the writing position is determined, thereby, the stable image formation can be conducted by the determination of the more accurate writing position than the conventional one, without depending on the passage position of the transfer sheet "p" or the size of the transfer sheet "p".

Further, in the present embodiment, because the passage position of the transfer sheet "p" in the primary scanning direction is detected as the absolute position by the position detection sensor 220 structured by the clock operation type contact line sensor, and according to the detection result, the writing position is determined, thereby, the stable image formation can be conducted by the determination of the accurate writing position by counting the clock, without depending on the passage position of the transfer sheet "p" or the size of the transfer sheet "p".

Further, in this embodiment, when the detection resolving power of the contact type line sensor is not smaller than 0.25 mm, the accuracy of about 100 dpi is obtained, thereby, the stable image formation can be carried out by the determination of the accurate writing position, without depending on the passage position of the transfer sheet "p" or the size of the transfer sheet "p".

Further, in this embodiment, because the detection resolving power of the contact type line sensor is integer times or a reciprocal of integer times the writing resolving power, the accuracy proportional to the writing resolving power is obtained, therefore, the stable image formation can be carried out by the determination of the accurate writing position, without depending on the passage position of the transfer sheet "p" or the size of the transfer sheet "p".

Further, in this embodiment, because the position detection sensor 220 is arranged on the downstream side of the registration roller 185, the sheet skew is corrected, and the accurate writing position can be determined corresponding to the final passage position of the transfer sheet "p", thereby, the accurate and stable image formation can be carried out.

Further, in this embodiment, because lighting of the LED light source 220a of the contact type line sensor is in timed relationship with the drive of the registration roller 185, the passage position of the transfer sheet "p" can be detected without uselessness, and the accurate writing position can be determined, thereby, the accurate and stable image formation can be carried out.

Further, in this embodiment, because the lighting of the LED light source 220a of the contact type line sensor is driven by using the clock made to be outputted during the driving of the registration roller 185, the unnecessary clock is not generated, thereby, the stable image formation can be carried out.

Further, in this embodiment, because the contact type line sensor having a range at least to cover one end of the maximum sized transfer sheet "p" and one end of the minimum sized transfer sheet "p", is used (refer to FIG. 4 and FIG. 5), the stable image formation can be carried out by the determination of the accurate writing position, without depending on the passage position of the transfer sheet up"p" or the size of the transfer sheet "p". Further, when the size of the transfer sheet "p" is constant, the contact type line sensor may be arranged corresponding to the maximum presupposition amount of the passage position. Incidentally, in the example shown in FIG. 5, X is corresponding to the transfer position data.

Further, in this embodiment, because the passage position of the transfer sheet "p" is detected at a predetermined timing after the leading edge of the transfer sheet "p" is detected, the position in the state that the transfer sheet "p" actually passes, can be accurately detected, thereby, the stable image formation can be carried out by the determination of the accurate writing position, without depending on the passage position of the transfer sheet "p" or the size of the transfer sheet "p".

Further, in this embodiment, because the sensor output is sampled and held, and compared to a predetermined value, and the sheet end position of the transfer sheet is detected, the position in the state that the transfer sheet "p" actually passes, can be accurately detected, thereby, the stable image formation can be carried out by the determination of the accurate writing position, without depending on the passage position of the transfer sheet "p" or the size of the transfer sheet "p".

Further, in this embodiment, because the count of the driving clock is stopped at the output change point of the comparator 240, the position in the state that the transfer sheet "p" actually passes, can be accurately detected, thereby, the stable image formation can be carried out by the determination of the accurate writing position, without depending on the passage position of the transfer sheet "p" or the size of the transfer sheet "p".

Further, in this embodiment, because the counter 250 to detect the passage position of the transfer sheet "p" is arranged in the vicinity of the position detection sensor 220, the wiring which has a possibility of generating noises, is greatly shortened. Because the output of the comparator 240 which is the detection result, is transferred in the serial communication, data can be transferred even when the number of wiring is small, and in the portion in which the wiring becomes long, a possibility of generating noises can be reduced.

Further, in this embodiment, because the data of the passage position of the transfer sheet "p" is compared to a predetermined value, thereby, the stable image formation can be carried out by the determination of the accurate writing position, without depending on the passage position of the transfer sheet "p" or the size of the transfer sheet "p".

As detailed above, in the present invention, because the writing position is determined by defining the position of the edge position of the recording material in the primary scanning direction, detected by the position detection sensor, as the absolute position, and the control is conducted so that the writing is started by the writing apparatus, thereby, the stable image formation can be carried out by the determination of the accurate writing position, without depending on the passage position of the transfer sheet or the size of the transfer sheet.

What is claimed is:

1. An image forming apparatus comprising:
    (i) a writing device for writing an image on the basis of image data;
    (ii) a conveying device for conveying a recording material;
    (iii) a clock operation type contact type line sensor having a LED light source for detecting a point of an edge in a primary scanning direction of the recording material conveyed by the conveying device as an absolute position; and
    (iv) a controller for determining a recording starting position in the primary scanning direction for the image written by the writing device according to the absolute position.

2. The image forming apparatus of claim 1, wherein detection resolving power of the clock operation type contact type line sensor has a detection error of not more than 0.25 mm.

3. The image forming apparatus of claim 1, wherein detection resolving power of the clock operation type contact type sensor is integer times or a reciprocal of integer times writing resolving power of the writing device.

4. The image forming apparatus of claim 1, wherein the conveying device comprises register means for re-feeding the recording material before the image is written thereon after the recording material is temporarily stopped, and the position detecting sensor is provided downstream of the register means to the conveyance direction of the recording material.

5. The image forming apparatus of claim 4, wherein the position detecting sensor is a contact type line sensor having a LED light source which is controlled to be turned on in synchronization with the start of driving of the register means.

6. The image forming apparatus of claim 4 further comprising a clock generator for generating a clock during the driving of the register means, wherein the position detecting sensor is a clock operation type contact type line sensor having a LED light source, and is driven and controlled according to the clock generated by the clock generator.

7. The image forming apparatus of claim 1, wherein the clock operation type contact line sensor has a size which both of one end in the primary scanning direction of the recording material having usable maximum length in the primary scanning direction, and one end in the primary scanning direction of the recording material having a usable minimum length in the primary scanning direction, can be detected.

8. The image forming apparatus of claim 1 further comprising a leading edge detecting sensor provided substantially in the same position as that of the position detecting sensor to the conveying direction of the recording material for detecting a leading edge of the recording material, wherein the position detecting sensor detects the edge in the primary scanning direction of the recording material when a predetermined period of time passes after the leading edge detecting sensor detects the leading edge of the recording material.

9. The image forming apparatus of claim 1 further comprising a position detecting device including:

a counter for counting a drive clock for the clock operation type contact type line sensor;

sample holding means for holding an output value output from the clock operation type contact type line sensor in synchronization with the drive clock; and a comparator for comparing a holding result held by the sample holding means with a threshold representing whether the recording material is present or not.

10. The image forming apparatus of claim 9, wherein the counter stops a counting when a result compared by the comparator changes and the controller controls the recording starting position for the image written by the writing device on the basis of a counted value when the counter stopped the counting, as an end of the recording material in the primary scanning direction.

11. The image forming apparatus of claim 9, wherein the position detecting device is provided in the vicinity of the clock operation type contact type line sensor and an output of the counter is sent serially to the controller.

12. The image forming apparatus of claim 1 further comprising a photoreceptor, wherein the writing device is an exposing device for exposing a surface of the photoreceptor.

13. The image forming apparatus of claim 1, wherein the conveying device comprises register means for re-feeding the recording material before the image is written thereon after the recording material is temporarily stopped, and the clock operation type contact type line sensor is provided downstream of the register means to the conveyance direction of the recording material.

14. The image forming apparatus of claim 13, wherein the LED light source is turned on in synchronization with the start of driving of the register means.

15. The image forming apparatus of claim 13 further comprises a clock generator for generating a clock during the driving of the register means, wherein the clock operation type contact type line sensor is controlled according to the clock generated by the clock generator.

16. The image forming apparatus of claim 1 further comprising a leading edge detecting sensor provided substantially in the same position as that of the clock operation type contact type line sensor to the conveying direction of the recording material for detecting a leading edge of the recording material, wherein the clock operation type contact type line sensor detects the edge in the primary scanning direction of the recording material when a predetermined period of time passes after the leading edge detecting sensor detects the leading edge of the recording material.

17. The image forming apparatus of claim 1, wherein the controller controls the writing device according to the recording starting position.

18. The image forming apparatus of claim 1 further comprising a photoreceptor, wherein the writing device is a device for forming an electrostatic latent image by exposing a surface of the photoreceptor, and the writing position is an exposure starting position on the photoreceptor.

19. The image forming apparatus of claim 18 further comprising a transfer device for transferring a toner image formed on the surface of the photoreceptor onto the recording material, the position detecting sensor is provided upstream of a transfer position by the transfer device in a conveyance direction of the recording material.

\* \* \* \* \*